A. A. PRATT.
VEHICLE MOUNTING.
APPLICATION FILED NOV. 18, 1912.
1,080,847.
Patented Dec. 9, 1913.
3 SHEETS—SHEET 1.
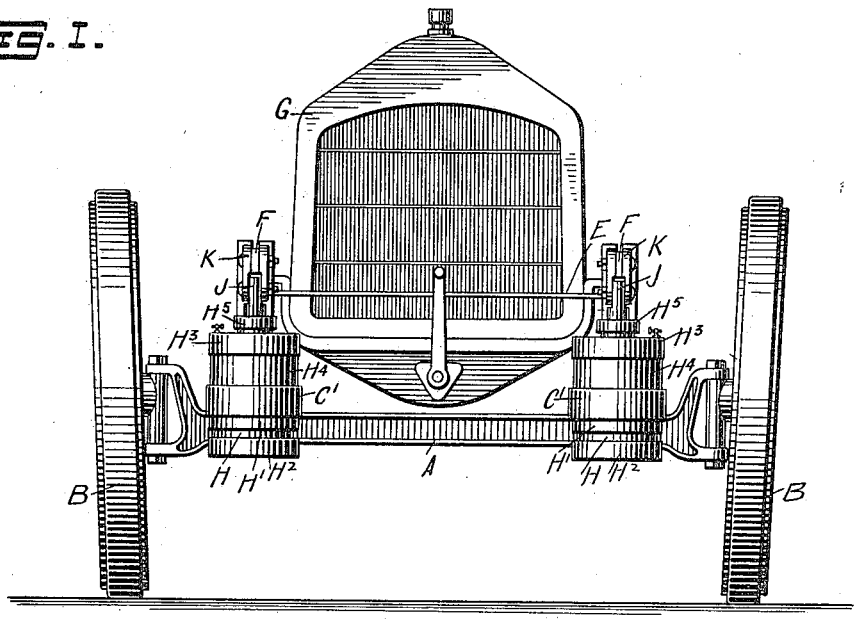
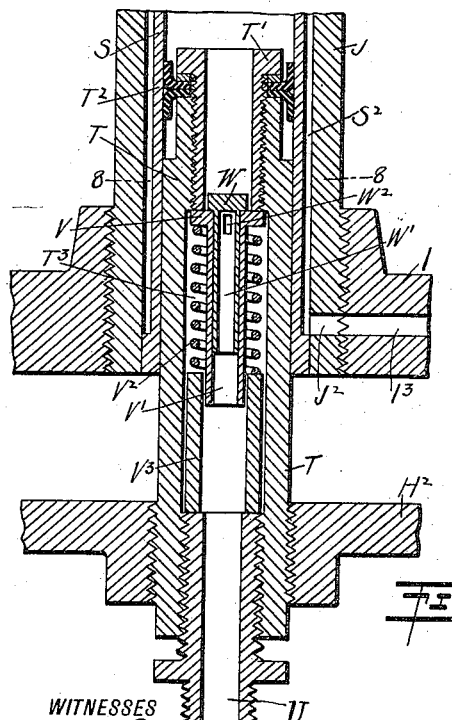
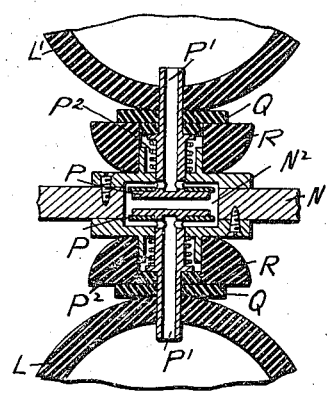
WITNESSES
INVENTOR
ALLISON A. PRATT,
BY
ATTORNEYS A. A. PRATT.
VEHICLE MOUNTING.
APPLICATION FILED NOV. 18, 1912.
1,080,847.
Patented Dec. 9, 1913.
3 SHEETS—SHEET 2.
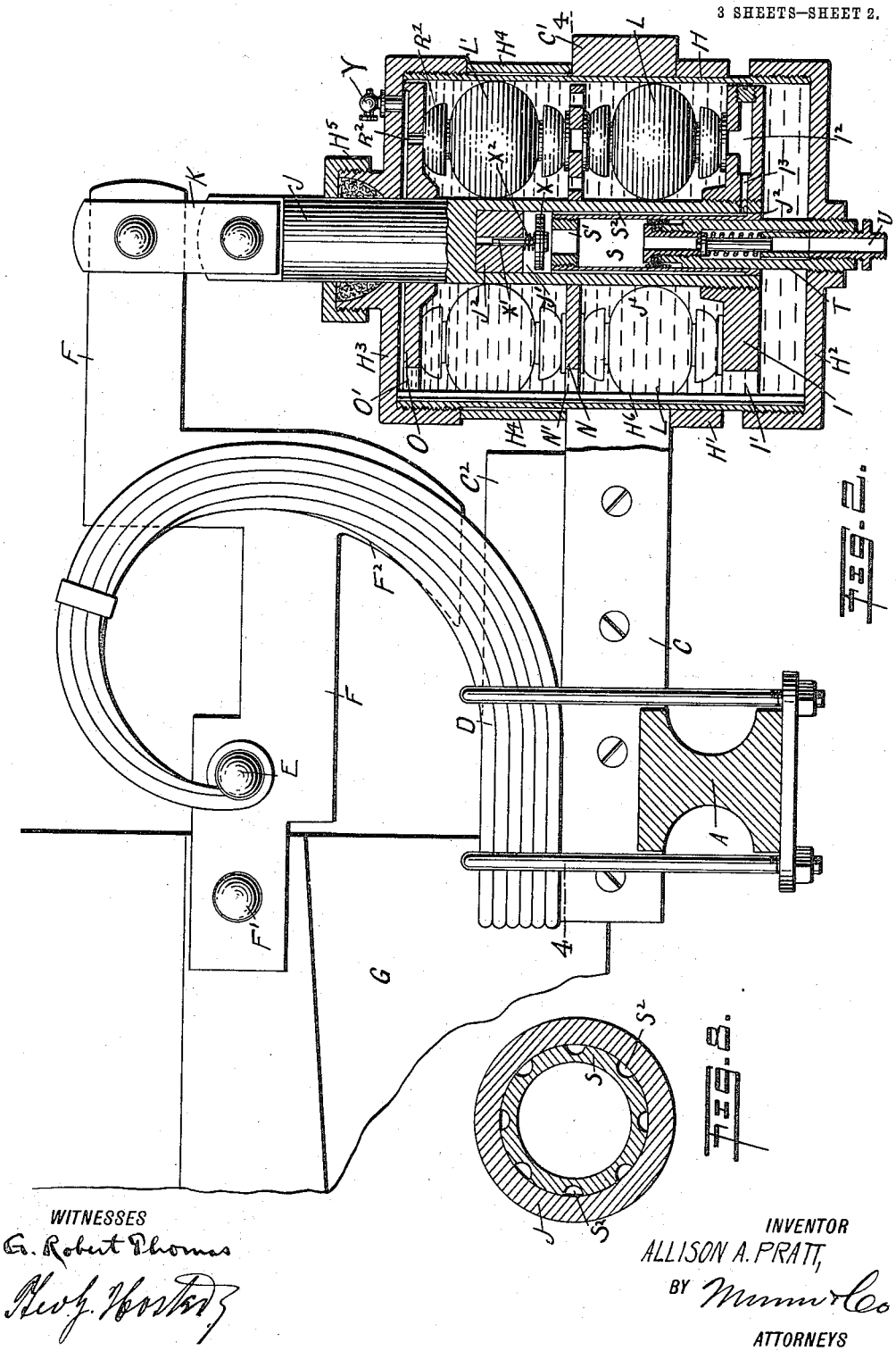
WITNESSES
INVENTOR
ALLISON A. PRATT,
BY
ATTORNEYS

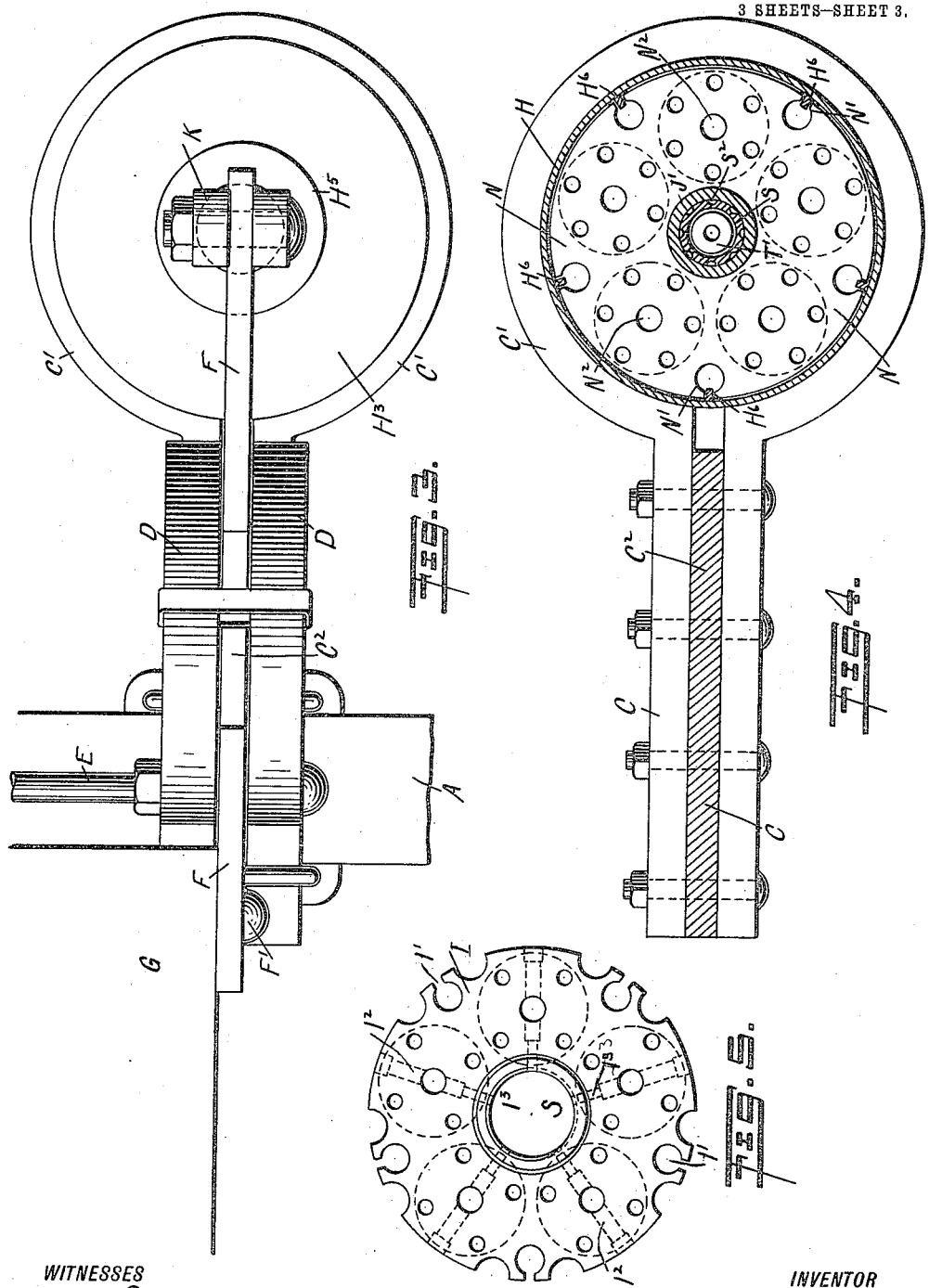

UNITED STATES PATENT OFFICE.

ALLISON A. PRATT, OF NEW YORK, N. Y.

VEHICLE-MOUNTING.

1,080,847.

Specification of Letters Patent.

Patented Dec. 9, 1913.

Application filed November 18, 1912. Serial No. 731,977.

*To all whom it may concern:*

Be it known that I, ALLISON A. PRATT, a citizen of the United States, and a resident of the city of New York, borough of Manhattan, in the county and State of New York, have invented a new and Improved Vehicle-Mounting, of which the following is a full, clear, and exact description.

The invention relates to automobiles and like vehicles, and its object is to provide a new and improved vehicle mounting or suspension which is exceedingly sensitive and arranged to take up all jars and jolts incident to the vehicle traveling over rough roads, obstructions and the like, to insure easy and comfortable riding in the vehicle without requiring the use of pneumatic or similar tires, thus reducing tire expense to a minimum and eliminating the danger and delay caused by bursting tires and the like.

For the purpose mentioned, use is made of a cushioning device interposed between the axle and the vehicle body, the tension of the said device being gradually reduced on the upward movement of the axle and increased on the downward movement of the axle, that is, during the time the vehicle wheel passes over an obstruction.

A practical embodiment of the invention is represented in the accompanying drawings forming a part of this specification, in which similar characters of reference indicate corresponding parts in all the views.

Figure 1 is a front elevation of the vehicle mounting as applied to an automobile; Fig. 2 is an enlarged sectional side elevation of the same; Fig. 3 is a plan view of the same; Fig. 4 is a sectional plan view of the same on the line 4—4 of Fig. 2; Fig. 5 is a plan view of the presser plate; Fig. 6 is an enlarged sectional side elevation of part of the presser plate and the pump connected with the bottom of the casing; Fig. 7 is an enlarged sectional side elevation of the valves for a pair of superimposed inflatable balls; and Fig. 8 is a sectional plan view of the pump cylinder and the hollow stem of the presser plate, the section being on the line 8—8 of Fig. 6.

As shown in Fig. 1, the front axle A of an automobile or other vehicle carries the front or steering wheels B, and near each end of the axle A are clipped or otherwise secured arms C and springs D connected at their free ends with a pivot E in the form of a transverse rod and which form the fulcrum for up and down swinging levers F pivoted at F' to the body G of the automobile or other vehicle. In practice a double spring D is preferably used on each side of the vehicle body with the lever extending between the two members of the double spring, as indicated in Fig. 3, and each lever F is provided with arms $F^2$ engaging the opposite sides of the two spring members at or near the middle portion thereof. A rib $C^2$ is arranged between the straight ends of the arm C and extends between the two spring members. The arm C extends forwardly and terminates in a ring C' encircling a casing H and resting on an annular shoulder H' secured to the peripheral face of the casing H. The casing H is provided with a bottom cap $H^2$ and a top cap $H^3$, and between the top $H^3$ and the top of the ring C' is placed a ring $H^4$ to securely hold the casing H in position on the ring C' of the arm C. By the arrangement described, the casing H moves up and down with the axle A at the time one or both of the front wheels B pass over an obstruction in the roadway.

The casing H is preferably filled with a non-freezing liquid, such as glycerin, for instance, and within the lower portion of the casing H is arranged a presser plate I provided with a stem J extending through a stuffing box $H^5$ arranged on the top cap $H^3$. The upper end of the stem J is connected by a link K with the forward end of the lever F so that when the spring D is compressed the presser plate I moves downward in the casing H and when the spring D expands the presser plate I moves upward in the casing H as the latter moves bodily with the axle A.

The presser plate I is guided in its up and down movement on guideways $H^6$ arranged vertically on the inner face of the casing H, the guideways $H^6$ extending into slots or openings I' formed in the presser plate I to allow the liquid in the casing H to pass on the opposite faces of the presser plate I during the latter's up and down movement in the casing H. The presser plate I is provided with a number of pressure chambers $I^2$ in communication with hollow balls L, of rubber or other suitable flexible material, and the tops of the balls are engaged by an intermediate separating plate N on which rests a second set of hollow balls L' engaged at their upper ends by a top separating plate O normally resting against the under side of the cap H³. The separating plates N and O are slidably mounted on the stem J and also engage the guideways H⁶ the same as the presser plate I, the said separating plates N and O being for the purpose provided with openings N' and O', as indicated in Fig. 2.

Each pressure chamber I² has a valved connection with the corresponding ball L and the superimposed balls L and L' have valved connections with each other so that air pressure in a chamber I² can pass through the corresponding superimposed balls L, L' to keep the latter inflated. The separating plate N is provided with pressure chambers N² similar to the pressure chambers I² and as the valved connection between the pressure chambers I² and the balls L is the same as the connection between the pressure chambers N² and the balls L and L', it suffices to describe but one in detail, special reference being had to Fig. 7. In each of the pressure chambers I² or N² is arranged a valve P for each ball L or L', the valve P having a hollow stem P' extending into the corresponding ball L or L'. Each stem P' is pressed on by a spring P² to allow the valve P to close immediately in case the corresponding ball L or L' breaks or bursts, so that this ball is cut out of the sets of balls and the others are not deflated.

On each valve stem P' adjacent the ball L or L' is arranged a washer Q between which and the plate N or the top of the presser plate I is interposed a bumper R, made preferably of rubber, similar to the washers Q and the balls L and L'. The portion of the bumper R adjacent the presser plate I and the plate N is curved, as plainly indicated in Figs. 2 and 7, so that when the balls L, L' are subjected to pressure then a portion of the pressure is taken up by the bumpers R and the latter prevent a short bend in the walls of the balls L and L' owing to the curvature given to the bumpers R. A bumper R' is arranged between the washer Q on top of each ball L' and the top plate O, and the bumper R' is provided with a pin R² engaging an aperture in the top plate O to hold the bumper R' in place.

Air is pumped into the pressure chambers I² by the use of a pump arranged as follows: The lower portion J' of the stem J is made hollow and into it extends a cylinder S secured at its lower end to the lower end of the stem J. In the pump cylinder S works a plunger T secured at its lower end to the bottom cap H² of the casing H so as to move with the said casing to produce a pumping action in the cylinder S. The upper end of the cylinder S terminates a distance below the upper end of the hollow portion J' and the upper end of the cylinder S is provided with a valve seat S' connecting the interior of the cylinder S with the upper end of the hollow portion J'. The outer face of the cylinder S is provided with vertically-extending grooves S² extending from the top of the cylinder to within a distance of the bottom thereof, as plainly indicated in Fig. 2, and the lower end of each groove S² connects with a port J² formed in the lower end of the stem J, and the port J² is in register with a port I³ leading to a corresponding pressure chamber I². The plunger T is made hollow and into the lower end screws a nipple U adapted to be connected with a hand pump or other device for forcing compressed air through the nipple U and the plunger T into the cylinder S from which the air can pass by way of the valve seat S', the upper end of the hollow portion J', grooves S² and ports J² and I³ into the pressure chamber I² to finally pass by way of the valve P into the balls L and L' to inflate the same with a desired pressure.

The upper end of the plunger T is provided with a valve seat T' serving to fasten a packing T² in place on the upper end of the plunger T to insure proper pumping action of the plunger T in the cylinder S. The lower end of the valve seat T' extends into an enlarged bore T³ of the plunger T and its valve V is provided with a hollow stem V' around which is coiled a spring V² pressing with its upper end against the under side of the valve V to hold the same against the valve seat T'. The lower end of the spring V² rests on a washer V³ on the upper end of the nipple U so that when the latter is screwed up the tension of the spring V² is increased and when the nipple U is screwed downward the tension of the spring V² is decreased, that is, the tension of the spring V² can be adjusted to a predetermined pressure. On top of the valve V is seated an inlet valve W having a hollow stem W' slidingly engaging the stem V', and the stem W' is provided at its upper end with an opening W² adapted to open into the valve seat T' at the time the valve W is moved upward into an open position relatively to the valve V so that air pumped through the nipple U by an air pump or other means can pass into the pressure chambers I², as previously explained, and when the desired pressure is reached in the pressure chambers I² the pump is disconnected from the nipple U and the valve W moves into closed position. In case the pump produces in the pressure chambers I² pressure exceeding normal pressure to which the spring V² has been set then the valve V opens in a downward direction to allow the excess pressure to pass out of the cylinder S by way of the valve seat T', open valve V and large bore T³, washer V³ and nipple U into the outer air. The valve seat S' is adapted to be closed by a valve X having a stem X' mounted to slide in a block J² held in the upper hollow end J' of the stem J. A spring X² presses the valve X to normally hold the same to the seat S'. It is understood that the valve X opens on pressure within the pump cylinder S but closes on excessive pressure from the chambers I² during compression of the balls L and L'. The cap H³ is provided with an air escape faucet Y.

The operation is as follows: The balls L and L' are normally inflated to a predetermined pressure and when any one of the wheels B passes over an obstruction in the roadway then during the upward movement of the axle A the casing H moves up with the axle and in doing so the pressure from the presser plate I is reduced and during the downward movement of the axle A the casing H moves downwardly so that the pressure on the presser plate I is increased and consequently the shock or jolt incident to the downward movement of the axle A is taken up by the compressible balls L, L' and hence the shock is not transmitted by the presser plate I, stem J and lever F to the vehicle body G.

It will be noticed that the lever F is pivotally connected at E with the spring D at a point intermediate the pivot F', and the connection with the link K of the stem J, and the pivot E is located near the pivot F' to provide a long leverage for the stem J. Hence any jar or jolt given to the axle A on the wheels B passing over an obstacle in the roadway causes a swinging of the lever F and a consequent increase or decrease in the tension of the tension device in the casing H so that the jar or jolt is taken up by the tension device and is not transmitted to the vehicle body G.

It is further understood that most of the shock is absorbed by the cushioning device nearest the wheel passing over the obstruction at the time as that part of the axle rises higher than the one connected with the other pressure device on the other side of the vehicle. By the use of the cushioning devices referred to the wheels B may be provided with ordinary tires instead of the inflatable or pneumatic tires now generally used, and hence tire expense is reduced to a minimum and at the same time all danger and delay caused by bursting tires is eliminated.

When the axle A is raised on the wheels B passing up on an obstruction in the roadway, the springs D are compressed and during this time the pressure of the tension reduced, and when the axle A moves downward on the wheels B passing down on the obstruction the pressure of the tension devices is increased, so that during the up movement of the axle A the jolt or jar is taken up by the springs D and during the downward movement the rebound is taken up by the tension device and the springs D gradually return to normal load-sustaining position. The relative movement of the casing H and the stem J causes a reciprocating of the piston T in the cylinder S and the air in the upper end of the cylinder is forced into the balls whenever the pressure in the balls is less than the tension of the spring T³ as otherwise the valve V moves into open position and no air is pumped into the balls. It is understood that the valve W opens on the suction stroke of the pump and seats itself on the return or compression stroke. The stem W' of the valve W is made of a considerable length to provide a long bearing for the inlet valve W in the relief valve V so that the valve W moves readily into open and closed position.

Having thus described my invention, I claim as new and desire to secure by Letters Patent:

1. In combination, a vehicle body, an axle, a lever pivoted on the vehicle body, a spring on the axle and on which the said lever is fulcrumed, a casing, an arm attached to the axle and carrying the said casing, a member movable in the said casing and connected with the free end of the said lever, and a series of compressible balls within the said casing and engaged by the said movable member.

2. In combination, a vehicle body, an axle, a lever pivoted on the vehicle body, a spring on the axle and on which the said lever is fulcrumed, a casing, an arm attached to the axle and carrying the said casing, a presser plate movable in the said casing and provided with a stem pivotally connected with the free end of the said lever, and a series of hollow compressible balls within the casing and pressed by the said presser plate.

3. In combination, a vehicle body, an axle, a lever pivoted on the vehicle body, a spring on the axle and on which the said lever is fulcrumed, a cushioning device having a casing, an arm attached to the axle and carrying the said casing, a member movable in the casing and connected with the said lever, the said lever having guiding means engaging the said spring, and cushioning means interposed between the said casing and the said movable member.

4. A cushioning device for vehicles, comprising a casing, a presser plate slidable within the casing, an arm for attachment to the axle and carrying the said casing, a lever fulcrumed on the vehicle spring and pivotally connected with the vehicle body, the said presser plate being connected with the said lever, a pressure chamber in the said presser plate, and a series of hollow compressible balls within the casing and in communication with the pressure chamber, the balls being pressed by the said presser plate.

5. A cushioning device for vehicles, comprising a casing, a presser plate slidable within the casing, an arm for attachment to the axle and carrying the said casing, a lever fulcrumed on the vehicle spring and pivotally connected with the vehicle body, the said presser plate being connected with the said lever, a pressure chamber in the said presser plate, a series of hollow compressible balls within the casing and in communication with the pressure chamber, the balls being pressed by the said presser plate, and an air pump controlled by the said presser plate for pumping air into the said balls.

6. A cushioning device for vehicles, comprising a casing for attachment to an axle of the vehicle, a liquid filling the said casing, a series of hollow compressible balls submerged in the said liquid, a lever fulcrumed on the vehicle spring and pivotally connected with the vehicle body, and a presser plate movable in the casing and connected with the said lever, the said presser plate having a pressure chamber in communication with the said hollow balls.

7. A cushioning device for vehicles, comprising a casing for attachment to an axle of the vehicle, a liquid filling the said casing, a lever fulcrumed on the vehicle spring and pivotally connected with the vehicle body, a series of hollow compressible balls submerged in the said liquid, a presser plate movable in the said casing and provided with a pressure chamber, a stem carrying the presser plate and connected with the said lever, a pump cylinder held in the hollow portion of the said stem and provided on its exterior surface with grooves in communication with the said pressure chamber, and a hollow pump plunger secured to the casing and extending into the said pump cylinder.

8. A cushioning device for vehicles, comprising a casing for attachment to an axle of the vehicle, a liquid filling the said casing, a lever fulcrumed on the vehicle spring and pivotally connected with the vehicle body, a series of hollow compressible balls submerged in the said liquid, a presser plate movable in the said casing and provided with a pressure chamber, a stem carrying the presser plate and connected with the said lever, a pump cylinder held in a hollow portion of the said stem and provided on its exterior surface with grooves in communication with the said pressure chamber, a hollow pump plunger secured to the casing and extending into the said pump cylinder, and a spring-pressed valve within the said plunger and controlling the passage of air through the plunger.

9. A cushioning device for vehicles, comprising a casing for attachment to an axle of the vehicle, a liquid filling the said casing, a lever fulcrumed on the vehicle spring and pivotally connected with the vehicle body, a series of hollow compressible balls submerged in the said liquid, a presser plate movable in the said casing and provided with a pressure chamber, a stem carrying the presser plate and connected with the said lever, a pump cylinder held in a hollow portion of the said stem and provided on its exterior surface with grooves in communication with the said pressure chamber, a hollow pump plunger secured to the casing and extending into the said pump cylinder, a spring-pressed valve within the said plunger and controlling the passage of air through the plunger, and means for regulating the tension of the said spring.

In testimony whereof I have signed my name to this specification in the presence of two subscribing witnesses.

ALLISON A. PRATT.

Witnesses:
   THEO. G. HOSTER,
   PHILIP D. ROLLHAUS.

---

Copies of this patent may be obtained for five cents each, by addressing the "Commissioner of Patents, Washington, D. C."